US008116357B2

(12) United States Patent
Chen

(10) Patent No.: US 8,116,357 B2
(45) Date of Patent: *Feb. 14, 2012

(54) METHODS AND CIRCUITS FOR POWER MANAGEMENT IN A TRANSCEIVER

(75) Inventor: Xi Chen, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 11/440,151

(22) Filed: May 25, 2006

(65) Prior Publication Data

US 2006/0209938 A1 Sep. 21, 2006

Related U.S. Application Data

(63) Continuation of application No. 09/415,679, filed on Oct. 8, 1999, now Pat. No. 7,079,571.

(60) Provisional application No. 60/103,688, filed on Oct. 8, 1998.

(51) Int. Cl.
*H04B 1/38* (2006.01)

(52) U.S. Cl. ........ 375/219; 375/312; 375/220; 375/222; 375/295; 455/13.2; 455/343.3; 455/343.4

(58) Field of Classification Search .................. 375/219, 375/220, 312, 222, 295; 455/13.2, 343, 13.4, 455/572, 127.5, 127, 343.3, 343.4; 710/60, 710/15; 368/156; 370/247
See application file for complete search history.

(56) References Cited

U.S. PATENT DOCUMENTS

| 5,404,544 | A | | 4/1995 | Crayford | |
|---|---|---|---|---|---|
| 5,422,807 | A | * | 6/1995 | Mitra et al. | 700/79 |
| 5,909,463 | A | * | 6/1999 | Johnson et al. | 375/220 |
| 5,910,930 | A | * | 6/1999 | Dieffenderfer et al. | 368/156 |
| 6,138,190 | A | * | 10/2000 | Nordling | 710/60 |
| 6,198,727 | B1 | | 3/2001 | Wakeley et al. | |
| 6,434,187 | B1 | | 8/2002 | Beard et al. | |
| 7,079,570 | B2 | * | 7/2006 | Pan et al. | 375/147 |

OTHER PUBLICATIONS

Psiber Data Systems Inc., LM 20/25 Application Notes, Sep. 9, 1998.

* cited by examiner

*Primary Examiner* — Eva Puente

(57) ABSTRACT

A transceiver circuit having 10 mb and 100 mb transmit and receive circuitries using the power saving methods of the present invention is disclosed. The power consumption of the transceiver circuit can be significantly reduced by providing each defined subcircuit with its own power supply and means of activation and deactivation. However, the method for activating and deactivating digital subcircuits and analog subcircuits are different and therefore different types of control signals and methods are provided. Furthermore, there are two general types of power-saving situations. The first type is near total circuit power-down and the second type is partial circuit power-down. The present invention in yet another embodiment discloses a method for minimizing energy usage during idle period.

17 Claims, 3 Drawing Sheets

Fig.2

| Clock Name | Power Down | Energy Detect | Auto-Neg | 10 Base T | 100 Base TX | Serial 10 BT | FX Mode | Test Loopback | PCS bypass 10 | PCS bypass 100 |
|---|---|---|---|---|---|---|---|---|---|---|
| bt_txc_20 | OFF | OFF | OFF | 20 | OFF | 20 | OFF | OFF | 20 | OFF |
| bt_rxc_20 | OFF | OFF | OFF | 20 | OFF | 20 | OFF | OFF | 20 | OFF |
| tx_txc | OFF | OFF | OFF | OFF | 25 | OFF | 25 | 25 | OFF | OFF |
| tx_rxc | OFF | OFF | OFF | OFF | 25 | OFF | 25 | 25 | OFF | 25 |
| mii_txc | OFF | 25/2.5 | 25 | 2.5 | 25 | 10 | 25 | 25 | 20 | 25 |
| mii_rxc | OFF | OFF | OFF | 2.5(a) | 25(a) | 10(a) | 25(a) | 25(a) | OFF | 25 |
| cp_arb | OFF | ON | 25 | 25 | OFF | 25 | OFF | OFF | OFF | OFF |

Fig.3

| Signal Name | Power Down | Energy Detect | Auto-Neg | 10 Base T | 100 Base TX | FX Mode | Test Loopback | PCS bypass 10 | PCS bypass 100 |
|---|---|---|---|---|---|---|---|---|---|
| mr_pd_pll | 1 | 1 | 0 | 0 | 0 | 0 | 0 | 0 | 0 |
| mr_pd_equal | 1 | 1 | 0 | 1 | 0 | 1 | 0 | 1 | 0 |
| mr_pd_bt_revr | 1 | 1 | 0 | 0 | 1 | 1 | 1 | 0 | 1 |
| mr_pd_lp | 1 | 1 | 0 | LINK | 1 | 1 | 1 | 1 | 1 |
| mr_pd_en_det | 1 | 0 | 0 | 1 | LINK | 0 | 0 | LINK(a) | LINK(b) |
| mr_pd_fx | 1 | 1 | 1 | 1 | 1 | 0 | 1 | 1 | 1 |

METHODS AND CIRCUITS FOR POWER MANAGEMENT IN A TRANSCEIVER

This application is a continuation of application Ser. No. 09/415,679, filed on Oct. 8, 1999, now issued as U.S. Pat. No. 7,079,571, which claims the benefit of U.S. Provisional Application Ser. No. 60/103,688, entitled "Reset and Power Management" filed on Oct. 8, 1998. The subject matter of these earlier filed applications are hereby incorporated by reference.

BACKGROUND OF THE INVENTION

1. Field of the Invention

The present invention generally relates to methods and circuits for power management, and in particular, to methods and circuits for power management in network transceivers.

2. Description of the Prior Art

In a network, there are generally one or more servers connected to a number of client machines via one or more hubs (or repeaters) and or switches. In each one of these devices, there may be one or more transceivers. Each transceiver, if connected to another transceiver, communicates with that transceiver. For example, generally speaking, a server machine has a network card, and there is a transceiver on the network card. If the server is connected to a repeater, it would be connected to the repeater at one of its ports and there would be a transceiver at this port (and each port of the repeater) communicating with the server in accordance with established protocols.

Figure 1A:
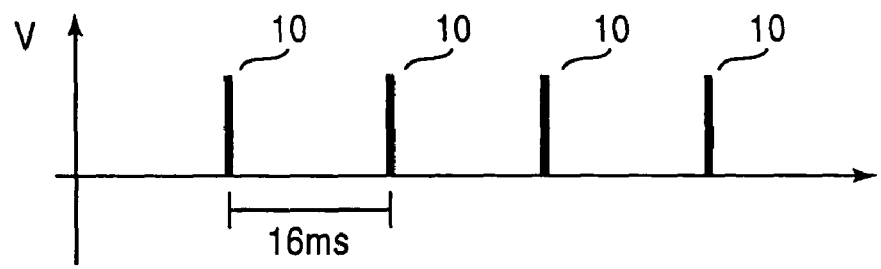

The manner in which the transceivers communicate with each other in an Ethernet environment is dictated by IEEE 802.3u. In the specification, it is specifically provided that for a 10 mb (mega bit per second) transceiver, during idle period (when the transceiver is not connected to another transceiver), the transceiver is required to transmit an idle signal to signal the existence of a live transceiver. In this manner, if another transceiver is connected to this transceiver, the two transceivers will detect the existence of each other and initiate communication protocol and transmit and receive data. FIG. 1a illustrates the industry standard specified normal link pulse ("nlp") for transmission in the 10 mb mode. Note that there is a single pulse 10 every 16 ms. For 10 mb auto negotiation mode, referring to FIG. 1b, the industry specification requires that there be pulses separated by 16 ms intervals and each pulse 12 having a duration greater than a predefined duration. For 100 mb transceivers, referring to FIG. 1c, the signal type MLT3 having 3 levels of signaling is used.

While the industry specifications provide the idle signal type for each mode of operation, for 10/100 mb transceivers, the MLT3 type idle signal is specified. The disadvantage with this specification is that the MLT3 signal consumers a high amount of energy even when there is no activity. It increases power consumption and requires higher cooling requirement—all results in higher system cost.

There is much advantage that can be had if the power consumption level of the transceiver can be minimized. For example, if a repeater uses transceivers with low power consumption, the repeater may be designed without the use of a mechanical cooling fan. The lack of a cooling fan translates to lower overall system cost and higher system reliability (there is not a fan to fail). For the 10/100 mb transceivers, there are many opportunities for power savings if the circuits is designed to minimize power use.

Therefore, it is desirable to have a transceiver device with low power consumption.

SUMMARY OF THE INVENTION

It is therefore an object of the present invention to provide methods and circuits for low-power transceiver devices.

It is another object of the present invention to provide methods and circuits for minimizing power consumption during idle period.

It is yet another object of the present invention to provide methods for dividing a 10/100 mb transceiver into subcircuits in order to minimize power consumption.

Briefly, in a presently preferred embodiments of the present invention, a transceiver circuit having 10 mb and 100 mb transmit and receive circuitries using the power saving methods of the present invention is disclosed. The power consumption of the transceiver circuit can be significantly reduced by providing each defined subcircuit with its own power supply and means of activation and deactivation. However, the method for activating and deactivating digital subcircuits and analog subcircuits are different and therefore different types of control signals and methods are provided. Furthermore, there are two general types of power-saving situations. The first type is near total circuit power-down and the second type is partial circuit power-down. The present invention in yet another embodiment discloses a method for minimizing energy usage during idle period.

An advantage of the present invention is that it provides methods and circuits for low-power transceiver devices.

Another advantage of the present invention is that it provides methods and circuits for minimizing power consumption during idle period.

Yet another advantage of the present invention is that it provides methods for dividing a 10/100 mb transceiver into subcircuits in order to minimize power consumption.

These and other features and advantages of the present invention will become well understood upon examining the figures and reading the following detailed description of the invention.

IN THE DRAWINGS

Figure 1B:
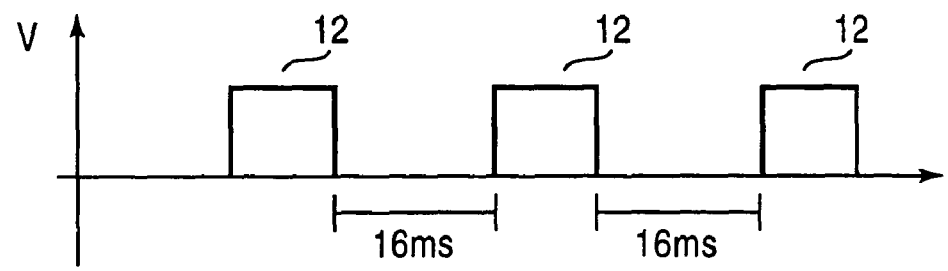
Figure 1C:
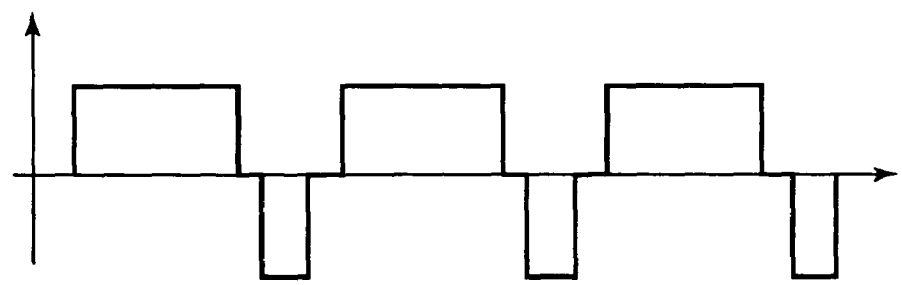
Figure 4:
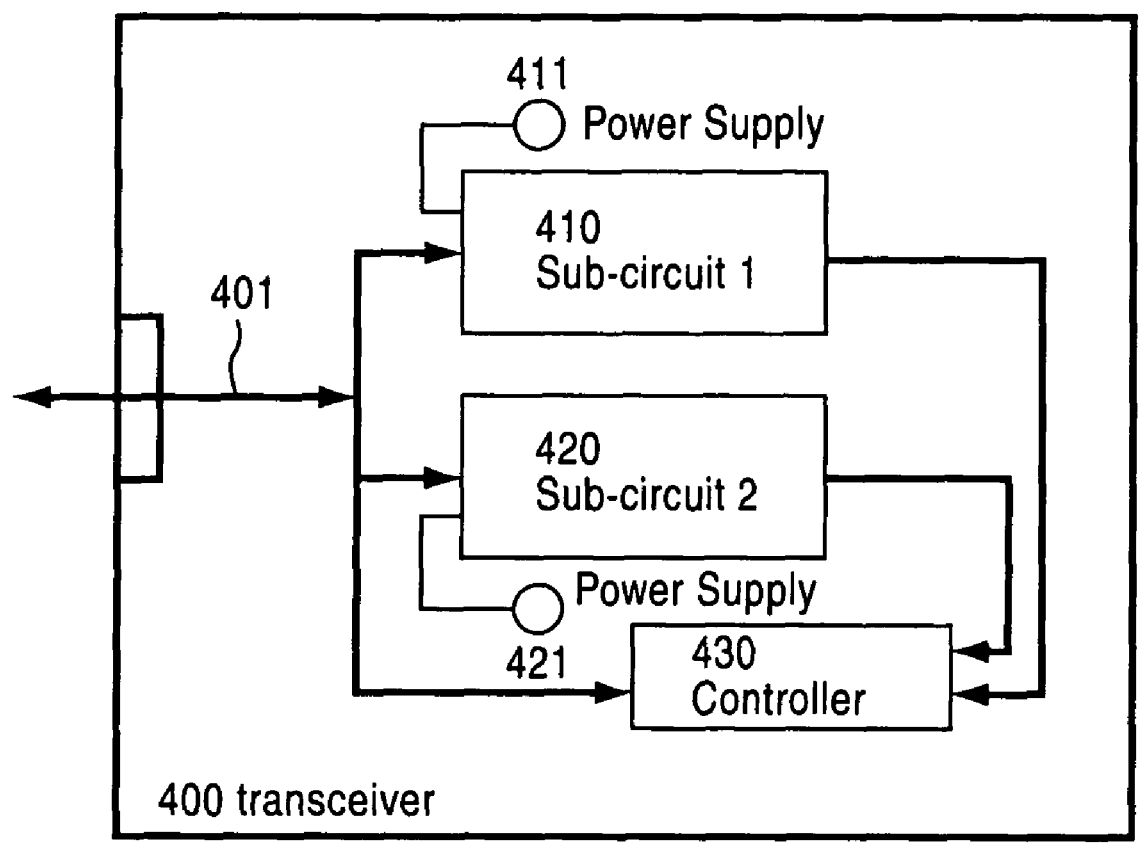

FIG. 1a illustrates the waveform of normal link pulse.
FIG. 1b illustrates the waveform of fast link pulse.
FIG. 1c illustrates the waveform of a MLT3 signal.
FIG. 2 illustrates a clock management summary table of the preferred embodiment.
FIG. 3 illustrates a power management logic control table of the preferred embodiment.
FIG. 4 illustrates a transceiver circuit, according to an embodiment of the present invention.

DETAILED DESCRIPTION OF THE PREFERRED EMBODIMENTS

In a presently preferred embodiments of the present invention, a transceiver circuit having 10 mb and 100 mb transmit and receive circuitries using the power saving methods of the present invention is disclosed. The power consumption of the transceiver circuit can be significantly reduced by providing each defined subcircuit with its own power supply and means of activation and deactivation. However, the method for activating and deactivating digital subcircuits and analog subcircuits are different and therefore different types of control signals and methods are provided. Furthermore, there are two general types of power-saving situations. The first type is near total circuit power-down and the second type is partial circuit power-down.

In the first type of power-saving situation, two power-saving modes are provided. In the first power-saving mode, the transceiver circuit is powered-down. This may be achieved by providing a register and setting the proper register value to activate the power-down mode, or providing a signal to a signal line to the transceiver circuit. In this mode, except for allowing management transactions (by writing to a management register) to the transceiver circuit, all power to other areas of the transceiver circuit is powered off, thus achieving maximum power saving.

In the second power-saving mode (for near total circuit power-down), by asserting the proper signal or register value, the present invention provides for nearly total power-down when either (1) there is no valid signal on the media or (2) when there is no valid data at the data interface (also known as media independent interface or MII). For the case where there is no valid data on the MII, most of the subcircuits of the transceiver can be powered-down.

Referring to FIG. 4, a transceiver circuit 400, according to one embodiment of the invention, is illustrated. The transceiver has an input 401 for transmitting and receiving data signals. The input 401 is connected to two subcircuits 410 and 420, with 410 being a transmitter subcircuit and 420 being a receiver subcircuit. Each subcircuit has its own respective power supply 411 and 421, and a controller 430 is also provided that allows for portions of the transceiver to be powered up or powered down.

For the case where there is no valid signal on the media (e.g. the transceiver is not connected to another transceiver), an analog energy-detect circuit is turned on to monitor for the existence of a signal on the media, and the serial management interface (or SMI) is turned on to allow for any management transaction (for managing the transceiver device). The rest of the receive circuits, which include all of the analog and digital circuits in the receive path, are turned off.

Furthermore, the transmit circuit of the transceiver of the present invention sends out an idle signal in accordance with the present invention. The link pulses of the preferred embodiment for the 10/100 transceiver is a short duration pulse recurring every predefined period (preferably every 16 ms) like the industry specified normal link pulse (nlp) for 10 baseT transceiver circuits. Although, the industry specification requires the MLT3 signal type to indicate a live connection on the media for 10/100 transceiver circuits. However, the MLT3 signal type consumes more power than otherwise. In the 10/100 transceiver of the present invention, a normal link pulse is used rather than the MLT3 pulse.

Upon receiving activity on the media, the transceiver circuit of the present invention immediately changes to a MLT3 type signal and enters into auto-negotiation mode (if activated). In this manner, although contravening industry specification, only minimal energy is used to indicate that the transceiver is alive and available. If the energy-detect circuit detects signal energy on the media, the receive circuit is turned on immediately. If the energy-detect circuit does not detect signal energy on the media after a predefined period, the transceiver circuit is powered down as described above.

For partial circuit power-down type of power saving methods, the transceiver of the present invention uses two clock management and power management to manage power consumption. Note that for digital circuits, stopping the clock to a particular circuit block effectively powers the block down, and for analog circuits, power down is achieved by asserting the power-down pin for the corresponding block.

Several clock signals are provided with the transceiver of the present invention. A clk_free clock signal provides a free running 25 MHz clock buffered from a crystal circuit; a clk_tx clock signal provides a free running 20/25 MHz transmit clock synthesized by a transmit PLL circuit where the clock frequency is controlled by another signal; and a clk_rx clock signal provides a 20/25 MHz Recovery clock where the frequency of this clock is controlled by another signal and this clock signal locks to clk_tx when no data is presented on the media and it is locked to the data when it is detected.

Additionally, several other clock signals are provided to the digital portion of the transceiver of the present invention. A bt_txc$_{13}$ 20 signal provides a 20 MHz transmit clock for 10 BaseT circuit; a bt_rxc_20 signal provides a 20 Mhz recovery clock for 10 BaseT circuit; a tx_txc signal provides 25 MHz transmit clock for 100 BaseT 100 Base FX circuit; a tx_rxc signal provides 25 MHz recovery clock for 100 BaseT 100 Base Fx circuit; a mii_txc signal providing a 25/2.5/10/25/20 MHz transmit clock for MII-100/MII-10/MII-10-Serial/SYM-100/SYM-10 interface; a mii_rxc 25/2.5/10/25 MHz recovery clock for MII-100/MII-10/MII-10-Serial/SYM100 interface; a cp_arb clock for auto-negotiation/arbitration circuit. The timers, mii-management, and led circuit of the transceiver of the present invention use the clk_free clock signal directly, which is always on. The mii-management and timers circuits need to have the clock signal even in power down mode in order to control the transceiver.

Referring to FIG. 2, a clock management summary table of the preferred embodiment is illustrated. Here, the operation modes are listed in the column titles. It can be seen that during the power-down mode, all of the clock signals are off to save power. In the energy-detect mode, only the mii_txc and cp_arb clock signals are activated to run the corresponding circuits. In the auto-negotiation mode, the mii_txc and cp_arb signals are activated to conduct the auto-negotiate task. During 10 BaseT operation, the clock signals for the 100 BaseT circuits are turned off. Likewise, during 100 BaseTx operation, the clock signals for the 10 BaseT circuits are turned off. For serial 10 BT operation, the clock signals for the 100 BaseT circuits are turned off. For the FX mode, the clock signals for 10 BaseT operation and cp_arb signal are turned off. For test loop back operation, this operation is conducted using 100 BaseT clock signals. For PCS (Physical Coding Sublayer) bypass 10 operation, the clock signals for the 100 BaseT circuits are turned off as well as the mii_rxc and cp_arb signals. For PCS bypass 100 operation, the clock signals for the 10 BaseT circuits are turned off as well as the mii_txc and cp_arb signals. As can be seen here, each clock signals corresponds to certain digital circuit blocks in the transceiver of the present invention. By turning off a clock signal, the corresponding circuit block of the transceiver is turned off.

For the analog portion of the transceiver of the present invention, a number of clock signals are provided as well. A mr_pd_pll signal controls the power to the transmit-PLL and clock recovery circuit. A mr_pd_equal signal controls the power to the equalizer and slicer. A mr_pd_bt_rcvr signal control the power to the analog portion of the 10 BaseT receiver. A mr_pd_pd_lp signal controls the power to the link pulse circuit (inside the energy detect block). A mr_pd_en_det signal for control the energy detect circuit. A mr_pd_fx signal for controlling the fx circuit and a mr_pwr_dwn signal for controlling the test, reference bias, and transmit blocks.

Referring to FIG. 3, a power management logic control table of the present invention is illustrated. Here, the operation modes are listed in the column titles and the various control signals are listed in the row titles. Note that a signal of "1" powers down the corresponding circuit. It can be seen that during the power down mode, all of the control signals power down their corresponding circuit. During the energy detect mode, only the mr_pd_en_det signal is activated. During the auto-negotiation mode, only the mr_pd_fx signal powers down its corresponding circuit. During 10 BaseT operation, the circuits corresponding to the mr_pd_pll, mr_bt_rcvr and mr_pd_en_det signals are active. During 100 BaseTx operation, the circuits corresponding to the mr_pd_pll, mr_pd_equal, and mr_pd_en_det are active. For the FX mode, the circuits corresponding to mr_pd_pdd and mr_pd_fx are active. In conducting test loopback, the circuits corresponding to mr_pd_pll, mr_pd_equal, and mr_pd_fx signals are active. For PC bypass 10 operation, the circuits corresponding mr_pd_pll, mr_bt_rcvr, and mr_pd_en_det signals are active. For PCS bypass 100 operation, the circuits corresponding to mr_pd_pll, mr_pd_equal, and mr_pd_en_det signals are active.

While the present invention has been described with reference to certain preferred embodiments, it is to be understood that the present invention is not to be limited to such specific embodiments. Rather, it is the inventor's intention that the invention be understood and construed in its broadest meaning as reflected by the following claims. Thus, these claims are to be understood as incorporating and not only the preferred embodiment described herein but all those other and further alterations and modifications as would be apparent to those of ordinary skill in the art.

What we claim are:

1. A method for power management in a transceiver circuit, the method comprising:
   transmitting, from a transmitter subcircuit of the transceiver circuit, a first pulse pattern during a powered-down mode of the transceiver circuit to indicate a status of the transceiver circuit and, wherein a first clock management scheme is employed to regulate the power consumption of the transceiver circuit while in powered-down mode,
   wherein said first pulse pattern differs from a second pulse pattern that is transmitted from the transmitter subcircuit to indicate that the transceiver is in a power-on mode;
   receiving data signals by a receiver subcircuit having a media independent interface for receiving the data signals, wherein said media independent interface remains powered-on during the powered-down mode of the transceiver circuit;
   powering the transmitter subcircuit with a first power supply;
   powering the receiver subcircuit with a second power supply; and
   changing a clock management scheme employed by the transceiver circuit based upon a desired operating mode of the transceiver circuit from a plurality of operational modes of the transceiver circuit, wherein the plurality of operational modes of the transceiver circuit includes the powered-down mode of the transceiver circuit.

2. The method of claim 1, wherein transmitting includes, transmitting a normal link pulse.

3. The method as recited in claim 1, wherein transmitting includes, transmitting a minimally powered pulse.

4. The method as recited in claim 1, wherein transmitting includes, transmitting the second pulse pattern once a signal is received on said receiver subcircuit.

5. The method as recited in claim 4, further comprising:
   detecting an entry by the transceiver circuit, into an auto-negotiation mode to identify the received signal on the receiver subcircuit.

6. A method as recited in claim 1, further comprising:
   activating said transceiver circuit into the power-on mode, based at least in part upon the receipt of a signal by the receiver subcircuit.

7. A method as recited in claim 1, further comprising:
   detecting an entry of the transceiver circuit into the power down mode; and
   powering-down, by the transceiver, all subcircuits of the transceiver except for said transmitter subcircuit and said media independent interface.

8. A transceiver comprising:
   a transmitter sub-circuit configured to:
      transmit a first repetitive pulse pattern, to indicate a status of the transceiver, during a time in which the transceiver is in a powered-down mode, and
      transmit a second repetitive pulse pattern during a time in which the transceiver is in an auto-negotiation mode, wherein the second repetitive pulse pattern consumes more power than the first repetitive pulse pattern;
   a receiver sub-circuit configured to receive data signals via a media independent interface, wherein the media independent interface is configured to remain powered-on during the powered-down mode of the transceiver; and
   a controller configured to place or remove the transceiver sub-circuit in to or out of the powered-down mode.

9. The transceiver of claim 8, wherein the transmitter sub-circuit is configured to transmit a normal link pulse during the powered-down mode of the transceiver.

10. The transceiver of claim 8, wherein the transmitter sub-circuit is configured to transmit a Multi-Level Transmit (MLT-3) pulse after the receiver sub-circuit receives a data signal.

11. The transceiver of claim 8, wherein the transmitter sub-circuit is configured to transmit the second pulse pattern after the receiver sub-circuit receives a data signal.

12. The transceiver of claim 8, wherein the transmitter sub-circuit is configured to switch to the auto-negotiation mode after the receiver sub-circuit receives a data signal.

13. The transceiver of claim 8, wherein the transceiver includes a plurality of clock signals, each clock signal configured to be off during one or more operational power modes of the transceiver such that the transceiver consumes different amounts of power during the one or more power operational modes.

14. The transceiver of claim 8, wherein the controller is configured to active the transceiver into a powered-on mode in response to the receipt of a data signal by the receiver sub-circuit.

15. The transceiver of claim 8, wherein the controller is configured to place the transceiver in the power-down mode by powering down all sub-circuits of the transceiver except the transmitter sub-circuit, and the media independent interface.

16. The transceiver of claim 8, wherein the transceiver is configured to enter a substantially total power-down mode in response to a lack of data signals received via the receiver sub-circuit.

17. An apparatus comprising:
   means for transmitting:
      a first repetitive pulse pattern, to indicate a status of at least the means for transmitting portion of the apparatus, during a powered-down mode of at least the means for transmitting, and
      a second repetitive pulse pattern during a time in which the transceiver is in an auto-negotiation mode;

means for receiving data signals, wherein the means for receiving is configured to remain powered-on during the powered-down mode of at least the means for transmitting; and means for controlling an operational power mode of at least the means for transmitting portion of the apparatus, wherein each operational power mode is associated with a clock signal power scheme, and wherein each clock signal power scheme regulates the operation of a plurality of clock signals received by a respective plurality of portions of the apparatus.

\* \* \* \* \*